(12) United States Patent
Wang

(10) Patent No.: US 9,335,191 B1
(45) Date of Patent: May 10, 2016

(54) HIGH-PRECISION PRESSURE SAMPLING HEAD OF PITOT TUBE FLOW SENSOR

(71) Applicant: Liaoning Bitobar Technologies Co., Ltd., Tieling, Liaoning (CN)

(72) Inventor: Zhonghui Wang, Tieling (CN)

(73) Assignee: Liaoning Bitobar Technologies Co., Ltd., Tieling, Liaoning Province (CN)

( * ) Notice: Subject to any disclaimer, the term of this patent is extended or adjusted under 35 U.S.C. 154(b) by 0 days.

(21) Appl. No.: 14/659,575

(22) Filed: Mar. 16, 2015

(30) Foreign Application Priority Data

Dec. 18, 2014 (CN) .......................... 2014 1 0785874

(51) Int. Cl.
*G01F 1/46* (2006.01)
(52) U.S. Cl.
CPC ........................................ *G01F 1/46* (2013.01)
(58) Field of Classification Search
CPC ........................................................ G01C 21/00
USPC ....................................... 73/861.65, 180, 182
See application file for complete search history.

(56) References Cited

U.S. PATENT DOCUMENTS

| | | | | |
|---|---|---|---|---|
| 4,718,273 A * | 1/1988 | McCormack | ....... | G01L 19/0007 73/180 |
| 5,099,686 A * | 3/1992 | Kohler | .................... | G01P 5/165 73/180 |
| 7,480,548 B2 * | 1/2009 | Shigemi | ................. | G01C 5/005 701/7 |
| 8,104,339 B2 * | 1/2012 | Elgersma | ................. | G01P 5/16 73/170.02 |

\* cited by examiner

*Primary Examiner* — Jewel V Thompson

(57) ABSTRACT

Present invention provides a high-precision pressure sampling head used in a Pitot tube flow sensor. The pressure sampling head includes a cylindrical pressure sampling head body. The cylindrical pressure sampling head body contains a total pressure channel and a static pressure channel. The axis of the total pressure channel and the axis of the static pressure channel are parallel to the axis of the cylindrical pressure sampling head body. Two inclined surfaces are formed on two opposite sides of the lower end of the cylindrical pressure sampling body. A first inclined surface intersects with the total pressure channel and thus a total pressure sensing hole is formed on the first inclined surface. A second inclined surface intersects with the static pressure channel and thus a static pressure sensing hole is formed on the second inclined surface. An angle $\alpha$ formed between the first inclined surface and the axis of the cylindrical pressure sampling head body is smaller than the angle $\beta$ formed between the second inclined surface and the axis of the cylindrical pressure sampling head body. Based on experimental results, when measuring the volume flow rate of a liquid in a pipe or conduit using the pressure sampling head according to the present invention, the fluid can flow stably through the pressure sampling head, with a high differential pressure between the total pressure sensing hole and the static pressure sensing hole. Thus, a pressure differential measuring device can more easily collect the data and achieve a higher precision of measurement. The measurement precision class can reach between 0.2-0.5.

3 Claims, 5 Drawing Sheets

HIGH-PRECISION PRESSURE SAMPLING HEAD OF PITOT TUBE FLOW SENSOR

CROSS REFERENCE TO RELATED APPLICATION

This application claims priority to and benefits of Chinese Patent Application No. 201410785874.2, filed with State Intellectual Property Office on Dec. 18, 2014, the entire content of which is incorporated herein by reference.

FIELD OF THE INVENTION

The present invention relates to a Pitot tube flow sensor, and more particularly to a highly precise pressure sampling head of Pitot tube flow sensor.

BACKGROUND TECHNOLOGY

Pitot tube flow sensors were invented based on the Pitot tube theory discovered by French scientist Henri Pitot. Pressure sampling head is the pressure sampling portion of a Pitot tube flow sensor.

A Pitot tube flow sensor includes a hollow cylindrical body, and the hollow cylindrical body contains an outer tube and an inner tube. The outer tube is connected to a total pressure channel and the inner tube is connected to a static pressure channel. A pressure sampling head is connected to the lower end of the hollow cylindrical tube. The pressure sampling head includes a cylindrical pressure sampling body. A cylindrical upper connecting portion is formed on the upper end of the cylindrical pressure sampling body. The cylindrical pressure sampling body of the pressure sampling head includes a total pressure channel and a static pressure channel, each of which has an axis parallel to the axis of the cylindrical pressure sampling body. The total pressure channel and the static pressure channel pass through the cylindrical upper connecting portion and form a total pressure channel opening and a static pressure channel opening on the cylindrical upper connecting portion. A total pressure sensing hole is formed on the lower end of the cylindrical pressure sampling body and is connected to the total pressure channel. A static pressure sensing hole is formed on the lower end of the cylindrical pressure sampling body and is connected to the static pressure channel. The pressure sampling head may be welded to the lower end of the cylindrical pressure sampling body. A Pitot tube flow sensor is made by connecting the pressure sampling head and the cylindrical pressure sampling body, connecting the total pressure channel opening to the outer tube, and connecting the static pressure channel opening to the inner tube.

When in use, a Pitot tube flow sensor, a pressure differential measuring device, and a flow totalizer are mounted together to form a Pitot tube flowmeter. The Pitot tube flow sensor is inserted into a pipe or conduit transversely through a side wall of the pipe or conduit. Total pressure sensing holes on the Pitot tube flow sensor face the upstream of the fluid flow and static pressure sensing holes on the Pitot tube flow sensor face the downstream of the fluid flow. When the fluid is flowing in the pipe or conduit, the total pressure data and the static pressure data of the fluid flow are output to the pressure differential measuring device through the total pressure channel opening and the static pressure channel opening, respectively. The pressure differential measuring device then transmits the differential pressure between the total pressure and the static pressure to a flow totalizer. The flow totalizer then calculates volume flow rate of the fluid flow based on the data and a Bernoulli equation.

In a Pitot tube flow sensor, the pressure sampling head connected to the lower end of the hollow cylindrical body has a big impact on precision of the pitot tube flow sensor. When a Pitot tube flow sensor equipped with the conventional pressure sampling head is used for measuring the volume flow rate of a pipe or conduit, because of the low precision of the conventional pressure sampling head, the final data obtained from the Pitot tube flow sensor is not precise enough. When a Pitot tube flowmeter consisting of a Pitot tube flow sensor containing a conventional pressure sampling head, a pressure differential measuring device, and a flow totalizer is used for measuring the volume flow rate of a pipe or conduit, the measurement precision class can only reach between 0.5-1.0.

SUMMARY OF THE INVENTION

One of the objectives of the present invention is to provide a new pressure sampling head, which has a high precision of measuring pressure and thus substantially increases the precision of measuring the volume flow rate of a fluid flow in a pipe or conduit when using a Pitot tube flow sensor containing the pressure sampling head.

In order to achieve the above objective, example embodiments of the present invention provide a high-precision pressure sampling head used in a Pitot tube flow sensor. The pressure sampling head includes a cylindrical pressure sampling head body. A cylindrical upper connecting portion is formed on the upper end of the cylindrical pressure sampling head body. The cylindrical pressure sampling head body contains a total pressure channel and a static pressure channel. The axis of the total pressure channel and the axis of the static pressure channel are parallel to the axis of the cylindrical pressure sampling head body. The total pressure channel and the static pressure channel pass through the cylindrical upper connecting portion and form a total pressure channel opening and a static pressure channel opening on the cylindrical upper connecting portion. A total pressure sensing hole is formed on the lower end of the cylindrical pressure sampling head body and is connected to the total pressure channel. A static pressure sensing hole is formed on the lower end of the cylindrical pressure sampling head body and is connected to the static pressure channel. Two inclined surfaces are formed on two opposite sides of the lower end of the cylindrical pressure sampling body. A first inclined surface intersects with the total pressure channel and thus a total pressure sensing hole is formed on the first inclined surface. A second inclined surface intersects with the static pressure channel and thus a static pressure sensing hole is formed on the second inclined surface. An angle α formed between the first inclined surface and the axis of the cylindrical pressure sampling head body is smaller than the angle θ formed between the second inclined surface and the axis of the cylindrical pressure sampling head body.

Based on experimental results, when measuring the volume flow rate of a liquid in a pipe or conduit using the pressure sampling head with the above described technical features, the fluid can flow stably through the pressure sampling head, with a high differential pressure between the total pressure sensing hole and the static pressure sensing hole. Thus, a pressure differential measuring device can more easily collect the data and achieve a higher precision of measurement. The experimental results show that the measurement precision class can reach between 0.2-0.5 when a pitot tube flowmeter consisting of a pitot tube flow sensor containing a pressure sampling head according to the example embodiments of the present invention, a pressure differential measuring device, and a flow totalizer is used for measuring the volume flow rate of a pipe or conduit. In contrast, when a Pitot tube flowmeter consisting of a Pitot tube flow sensor containing a conventional pressure sampling head, a pressure differential measuring device, and a flow totalizer is used for measuring the volume flow rate of a pipe or conduit, the measurement precision class can only reach between 0.5-1.0.

In an example embodiment, the range of the angle α formed between the first inclined surface and the axis of the cylindrical pressure sampling head body is between 10-30°. In an example embodiment, the range of the angle β formed between the second inclined surface and the axis of the cylindrical pressure sampling head body is between 70-90°.

In a preferred example embodiment, the angle α formed between the first inclined surface and the axis of the cylindrical pressure sampling head body is 20° and the angle β formed between the second inclined surface and the axis of the cylindrical pressure sampling head body is 80°.

When the angle α formed between the first inclined surface and the axis of the cylindrical pressure sampling head body is 20° and the angle β formed between the second inclined surface and the axis of the cylindrical pressure sampling head body is 80°, and when a pitot tube flowmeter consisting of a pitot tube flow sensor containing a pressure sampling head according to this example embodiment of the present invention, a pressure differential measuring device, and a flow totalizer is used for measuring the volume flow rate of a pipe or conduit, the measurement precision class can reach 0.2.

DETAILED DESCRIPTION OF THE PREFERRED EMBODIMENT

Figure 1:
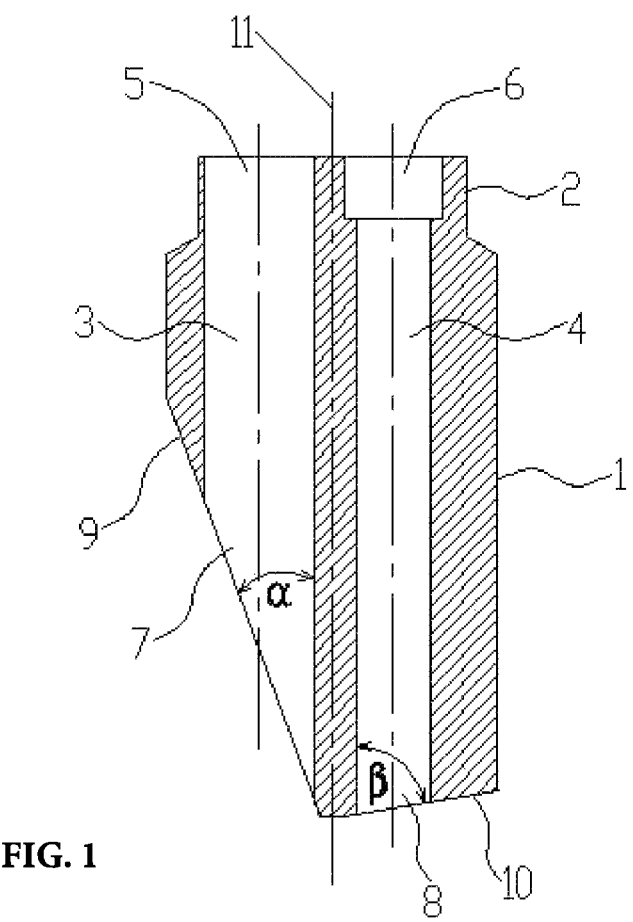
FIG. 1 is a cross-sectional view of a pressure sampling head of a Pitot tube flow sensor according to an example embodiment of the present invention.
Figure 2:
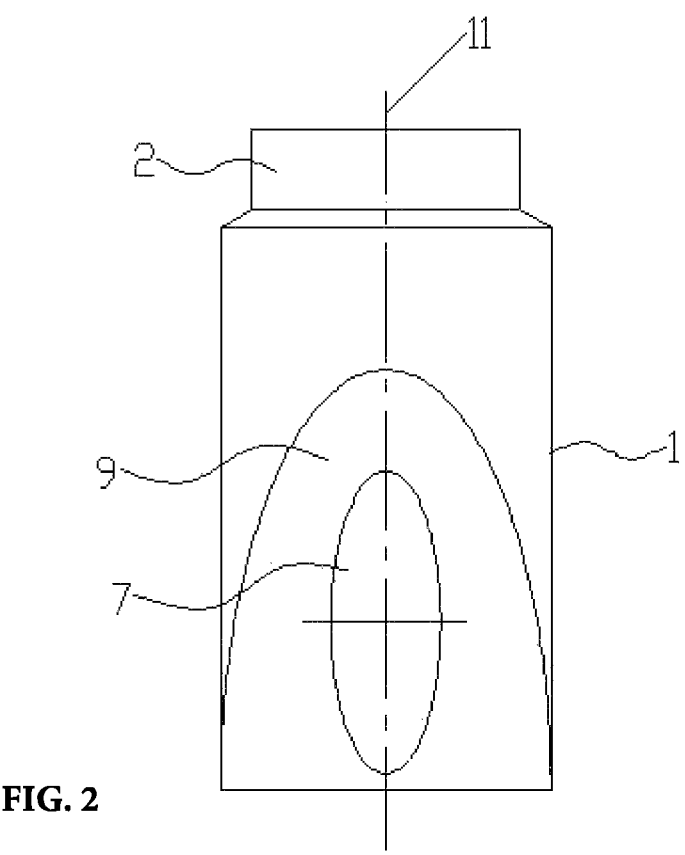
FIG. 2 is a side view of a pressure sampling head of a Pitot tube flow sensor according to an example embodiment of the present invention.
Figure 3:
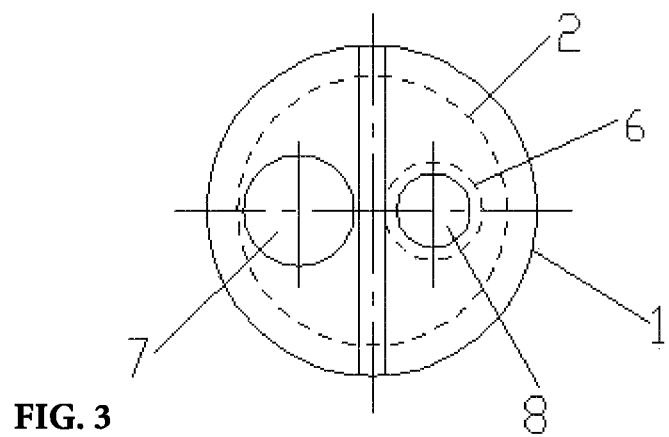
FIG. 3 is a top view of a pressure sampling head of a Pitot tube flow sensor according to an example embodiment of the present invention.
Figure 4:
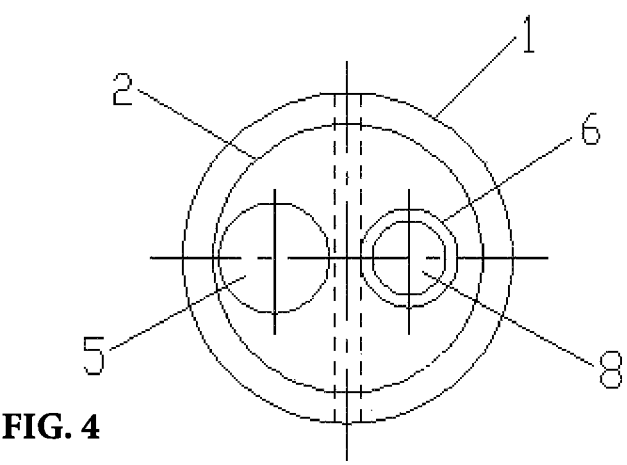
FIG. 4 is a bottom view of a pressure sampling head of a Pitot tube flow sensor according to an example embodiment of the present invention.

Referring to FIGS. 1-4, a high-precision pressure sampling head of a Pitot tube flow sensor includes a cylindrical pressure sampling head body 1. A cylindrical upper connecting portion 2 is formed on the upper end of the cylindrical pressure sampling head body 1. The cylindrical pressure sampling head body 1 contains a total pressure channel 3 and a static pressure channel 4. The axis of the total pressure channel 3 and the axis of the static pressure channel 4 are parallel to the axis of the cylindrical pressure sampling head body 1. The total pressure channel 3 and the static pressure channel 4 pass through the cylindrical upper connecting portion 2 and form a total pressure passage opening 5 and a static pressure passage opening 6 on the cylindrical upper connecting portion 2. A total pressure sensing hole 7 is formed on the lower end of the cylindrical pressure sampling body 1 and is connected to the total pressure channel 3. A static pressure sensing hole 8 is formed on the lower end of the cylindrical pressure sampling body 1 and is connected to the static pressure channel 4. Two inclined surfaces 9 and 10 are formed on two opposite sides of the lower end of the cylindrical pressure sampling head body 1. The inclined surface 9 intersects with the total pressure channel 3 and the total pressure sensing hole 7 is thus formed on the inclined surface 9. The inclined surface 10 intersects with the static pressure channel 4 and the static pressure sensing hole 8 is thus formed on the inclined surface 10. The angle α formed between the inclines surface 9 and the axis 11 of the cylindrical pressure sampling head body 1 is smaller than the angle β formed between the inclined surface 10 and the axis 11 of the cylindrical pressure sampling head body 1. In an example embodiment, the range of the angle α formed between the inclines surface 9 and the axis 11 of the cylindrical pressure sampling body 1 is between 10-30°. In an example embodiment, the range of the angle θ formed between the inclined surface 10 and the axis 11 of the cylindrical pressure sampling head body 1 is between 70-90°. In a preferred example embodiment, the angle α is 20° and the angle β is 80°.

Figure 5:
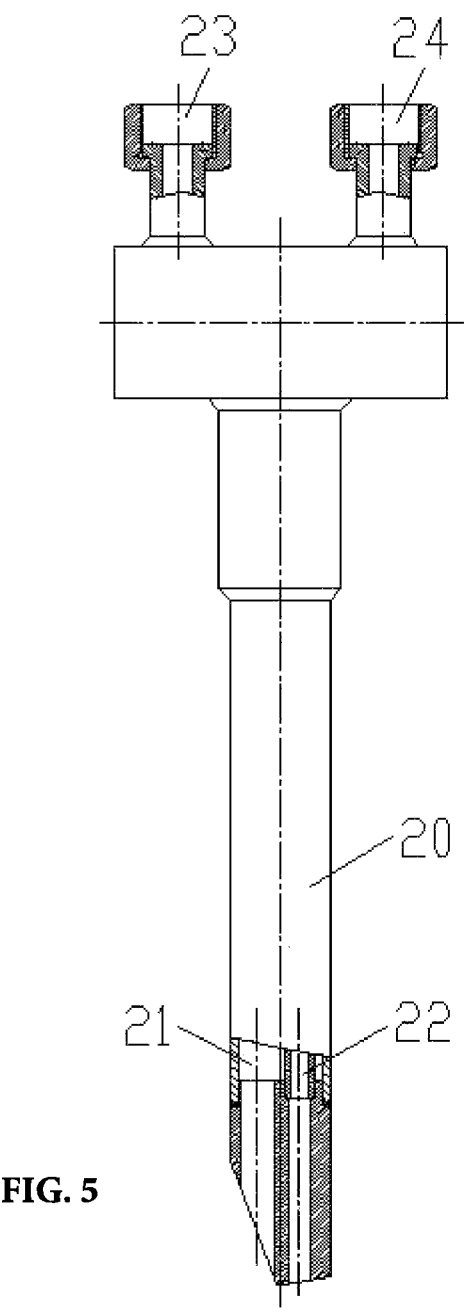
FIG. 5 is a perspective view of a Pitot tube flow sensor according to an example embodiment of the present invention.

Referring to FIG. 5, a Pitot tube flow sensor is shown, in which a pressure sampling head according to example embodiments of the present invention is adopted by welding the pressure sampling head to the flow sensor. The Pitot tube flow sensor includes a hollow cylindrical tube 20, which contains an outer tube 21 and an inner tube 22. The outer tube 21 and the inner tube 22 are connected to a total pressure connecting portion 23 and a static pressure connecting portion 24, respectively. A pressure sampling head according to example embodiments of the present invention is mounted to the lower end of the hollow cylindrical tube 20. In FIG. 5, the pressure sampling head is welded to the lower end of the hollow cylindrical tube 20. The pressure sample head may also be formed integrally with the lower end of the hollow cylindrical tube 20.

What is claimed is:

1. A high-precision pressure sampling head used in a Pitot tube flow sensor, comprising:
    a cylindrical pressure sampling head body;
    a cylindrical upper connecting portion formed on an upper end of the pressure sampling head body;
    a total pressure channel formed in the cylindrical pressure sampling head body, wherein the total pressure channel has an axis parallel to an axis of the cylindrical pressure sampling head body;
    a static pressure channel formed in the pressure sampling head body, wherein the static pressure channel has an axis parallel to the axis of the cylindrical pressure sampling head body;
    a total pressure channel opening formed on the cylindrical upper connecting portion, wherein the total pressure channel passes through the cylindrical upper connecting portion and the total pressure channel opening is thus formed;
    a static pressure channel opening formed on the cylindrical upper connecting portion, wherein the static pressure channel passes through the cylindrical upper connecting portion and the static pressure channel opening is thus formed;
    a total pressure sensing hole formed on a lower end of the cylindrical pressure sensing head body and connecting to the total pressure channel;
    a static pressure sensing hole formed on the lower end of the cylindrical pressure sensing head body and connecting to the static pressure channel; and a first inclined surface and a second inclined surface formed on two opposite sides of the lower end of the cylindrical pressure sampling body;

wherein the first inclined surface intersects with the total pressure channel and thus the total pressure sensing hole is formed on the first inclined surface, the second inclined surface intersects with the static pressure channel and thus the static pressure sensing hole is formed on the second inclined surface and an angle $\alpha$ formed between the first inclined surface and the axis of the cylindrical pressure sampling head body is smaller than the angle $\theta$ formed between the second inclined surface and the axis of the cylindrical pressure sampling head body.

2. The high-precision pressure sampling head used in a Pitot tube flow sensor according to claim 1, wherein a range of the angle $\alpha$ formed between the first inclined surface and the axis of the cylindrical pressure sampling head body is between 10-30° and a range of the angle $\beta$ formed between the second inclined surface and the axis of the cylindrical pressure sampling head body is between 70-90°.

3. The high-precision pressure sampling head used in a Pitot tube flow sensor according to claim 1, wherein the angle $\alpha$ formed between the first inclined surface and the axis of the cylindrical pressure sampling head body is 20° and the angle $\beta$ formed between the second inclined surface and the axis of the cylindrical pressure sampling head body is 80°.

* * * * *